Aug. 20, 1957 V. C. JUDD 2,803,147
VEHICLE STEERING MECHANISM
Filed June 28, 1955 2 Sheets-Sheet 1
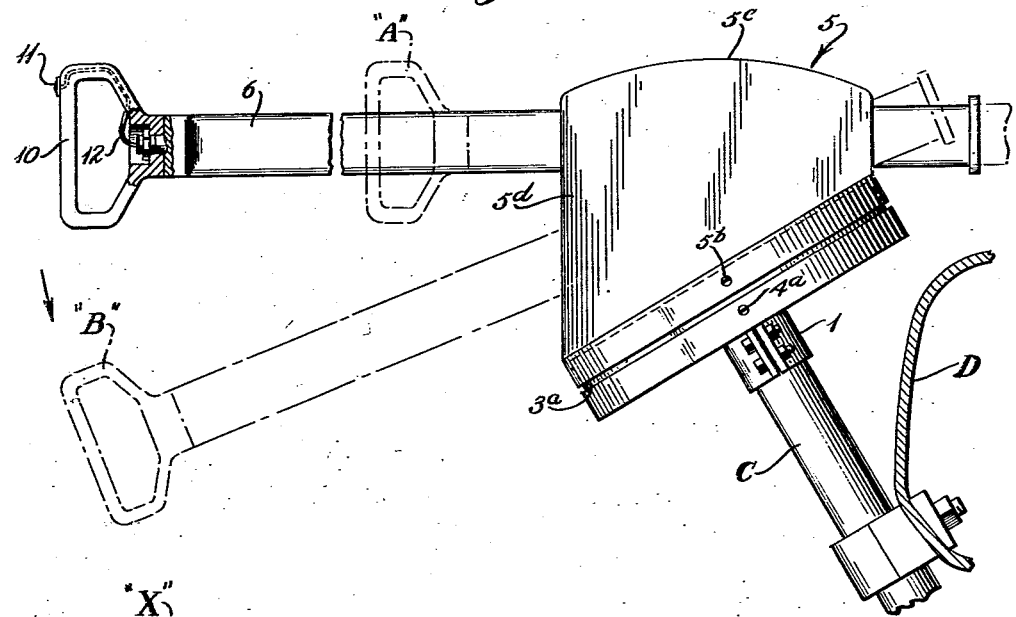
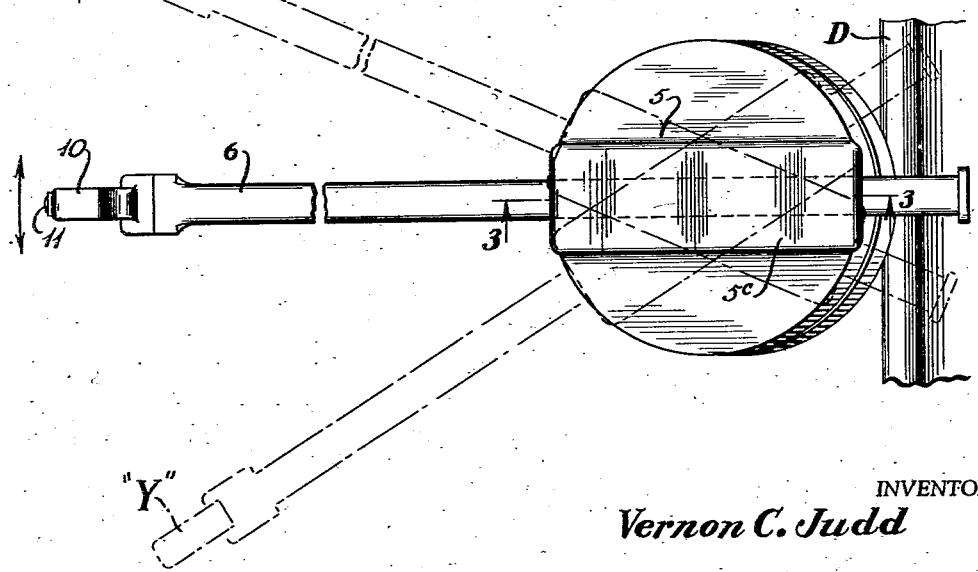
INVENTOR
Vernon C. Judd
BY Alexander & Dowell
ATTORNEYS Aug. 20, 1957   V. C. JUDD   2,803,147
VEHICLE STEERING MECHANISM
Filed June 28, 1955   2 Sheets-Sheet 2
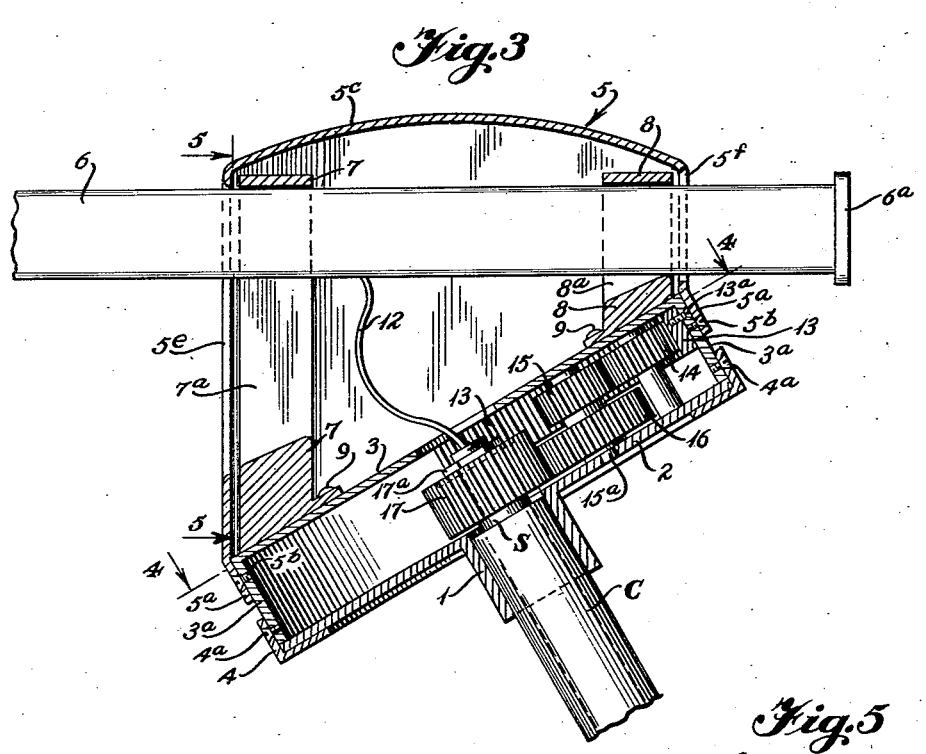
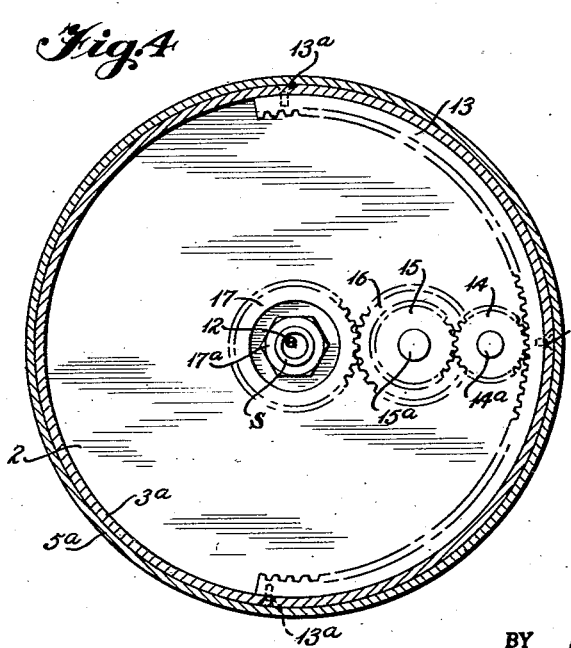
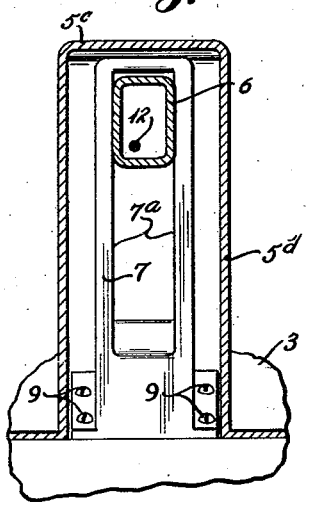
INVENTOR
*Vernon C. Judd*
BY
ATTORNEYS United States Patent Office 2,803,147
Patented Aug. 20, 1957

2,803,147

VEHICLE STEERING MECHANISM

Vernon C. Judd, Duquesne, Pa.

Application June 28, 1955, Serial No. 518,575

18 Claims. (Cl. 74—492)

My invention relates to vehicle steering devices, and more particularly relates to a steering mechanism which will afford greater safety to the driver of a vehicle involved in an accident.

It is well known that as a result of the fact that the steering column in a vehicle is generally a very rigid structure and extends rearwardly in the direction of the chest of the driver, when the vehicle is involved in a head-on crash the body of the driver is generally thrown forward by its own inertia, with the result that his chest is crushed by the steering column.

It is a primary object of this invention to provide a steering mechanism for a vehicle which mechanism includes a steering tiller which extends from the top of the steering column toward the driver but which tiller is mounted so that it can be easily pushed forward in the event of a crash so as to reduce the possibility of the driver's being injured by being thrown against it.

The principal object of this invention also includes a steering structure wherein the steering column is oriented in a more nearly vertical plane so that it does not extend directly outwardly toward the chest of the driver. By raising the angle of the steering column and by shortening the length thereof extending in the direction of the driver, the probability of his being injured by being thrown against the steering column is reduced.

By providing a structure having a steering tiller which can be pushed away from the driver, a further advantage of this invention is realized in that the steering tiller may also be adjusted longitudinally of the vehicle to permit the driver to position the same to his own personal comfort. In addition, the tiller may be pushed forwardly so as to leave the driver's compartment comparatively unobstructed to facilitate entering and leaving the vehicle.

Still another object of the present invention is to provide a tiller having a hand grip at the end thereof toward the driver, and being mounted in a housing at the upper end of the steering column in such a manner that the hand grip may be raised or lowered to suit the personal comfort of a particular driver, the elevation of the hand grip and of the tiller being maintained by an adjustable frictional engagement between the forward end of the tiller and the tiller support yokes housing to which it is attached, the latter being located at the upper end of the steering column. The frictional engagement should be so designed as to permit the tiller to be raised or lowered without undue effort but so as to provide sufficient resistance to change in elevation that the tiller will support the weight of the driver's hands and forearms.

A still further object of the present invention is to provide a steering mechanism of the type described wherein the housing at the upper end of the steering column includes a protective and decorative cover, a frictional supporting mechanism for the tiller and, in addition, encloses a gear train, which gear train transmits the angular displacements of the tiller and the housing to the steering shaft located within the steering column. The total angular displacement of the tiller required to turn the front wheels of the vehicle from a fully-turned position in one direction to the fully-turned position in the other direction should be in the neighborhood of 80 degrees. With this amount of angular displacement provided at the tiller end, it is necessary to provide a gear train having a ratio which will cause the steering shaft within the steering column to be rotated through the conventional number of turns (probably two complete turns) so that my novel steering arrangement may be used in conjunction with conventional motor cars.

This novel steering arrangement is particularly suited to use on vehicles equipped with power steering.

Further objects and advantages of my invention will become apparent during the following discussion of the drawings, wherein:

Figure 1 is a side elevation of my novel steering mechanism connected to the upper end of a steering column which in turn is supported by a vehicle dashboard, several alternative positions of the steering tiller being shown in dashed lines.

Fig. 2 is a plan view of the steering mechanism shown in Fig. 1, wherein several alternative angular positions of the tiller are shown in dashed lines.

Fig. 3 is an elevation view in section along line 3—3 of Fig. 2, Fig. 3 being somewhat enlarged.

Fig. 4 is a section view along line 4—4 of Fig. 3.

Fig. 5 is an enlarged section view along line 5—5 of Fig. 3.

Referring now to Figs. 1 and 2 of the drawings, a steering column C is shown attached by a conventional clamp to a dash board D of a vehicle. At the upper end of the steering column C is located the gear train assembly of my novel steering device, which assembly may be clamped to the steering column by a split ring clamp 1 attached to the gear supporting plate 2, as shown in Fig. 3. This plate 2 is circular when viewed axially of the steering column C and lies opposite an upper cover plate 3, which cover plate has a downwardly extending annular flange 3a around its periphery. Near the lower edge of the flange 3a is a flanged retaining ring 4 which may be secured to the flange 3a by means of screws 4a, by which structure the cover plate 3 is retained on the plate 2 while at the same time being permitted to rotate thereon.

Above the cover plate 3 is a housing 5, which housing includes a circular lower portion terminating at a flange portion 5a, which flange portion overlies the upper part of the flange 3a and is secured thereto by screws 5b so that when the housing 5 is rotated the cover plate 3 is also caused to rotate therewith. The upper portion of the housing 5 includes a dome 5c located at the top of a narrow portion 5d of the housing, which narrow portion is slotted in the front as at 5e and in the rear as at 5f, Fig. 3. The tiller 6 passes through the slots 5e and 5f and has an abutment 6a at its forward end, which abutment is provided to prevent withdrawal of the tiller 6 from the housing 5. Within the housing 5 are two yokes 7 and 8 which are secured to the cover plate 3 by screws 9, or by any other conventional means. The yokes 7 and 8 are slotted as at 7a and 8a so as to receive the tiller therethrough, the slots being so shaped as to permit the rear end of the tiller to be pivoted up and down so as to permit adjustment of its height to suit the personal comfort of the driver.

The engagement of the tiller with the slotted portions 7a—8a of the yokes 7 and 8 is sufficiently snug that the tiller will remain in whatever position and elevation the driver leaves it, and also is sufficiently snug that the tiller can be reciprocated within the slots 7a and 8a only by the exertion of a certain degree of force by the driver.

As illustrated in Figs. 1 and 2 the tiller 6 has a hand grip 10 at its rearmost end, which hand grip may also include a horn button 11 connected by a wire 12, which wire passes through a portion of the tiller to enter the housing 5, passing from there downwardly through a shaft S within the steering column C, Fig. 3, in the usual manner.

By the above described arrangement it will be seen that whenever the hand grip end of the tiller 6 is displaced back and forth, as shown in Fig. 2 in the lower dashed-line position of the tiller, the housing 5 and the cover plate 3 to which it is attached will likewise be rotated. By inspection of Fig. 4 it will be seen that the flange 3a of the cover plate 3 has a sector of a ring gear 13 attached thereto by means of screws 13a or by any other satisfactory connecting means. The ring gear 13 actually need be only semi-circular in shape, as shown in Fig. 4, and has a plurality of teeth around its inner periphery, which teeth engage with a spur gear 14, shown in Figs. 3 and 4. The spur gear is mounted on a fixed spindle 14a and meshes with the upper gear portion 15 of a dual gear which likewise is rotatably mounted on a spindle 15a. The upper gear 15 is connected with a lower gear 16 which is also mounted on the spindle 15a so that the rotation of the gear 15 causes similar rotation of the lower gear 16. The steering column houses a steering shaft S, to the upper end of which is attached a spur gear 17 for unitary rotation therewith. The spur gear 17 may be keyed (not shown) to the shaft S and may be retained thereon by a nut 17a.

Thus when the housing 5 and cover plate 3 are rotated by angular displacement of the tiller 6, the ring gear 13 is likewise rotated with respect to the plate 2, to which the spindles 14a and 15a are rigidly attached, and rotation of the ring gear 13 with respect to plate 2 transfers drive from the ring gear 13 to the gear 14, which likewise transmits the rotary motion to the upper gear 15. When the upper gear 15 is rotated the lower gear 16 to which it is attached is also caused to rotate, thereby causing rotation of the spur gear 17 and the attached steering shaft S.

At the lower end of the steering shaft S would be located either a power steering unit (not shown) or a conventional gear box (not shown).

The above described novel steering mechanism permits the driver of a vehicle to grasp the hand grip 10 and either pull the tiller 6 toward him or push it away from him until he reaches a comfortable position. Several of the positions of the tiller and hand grip 10 are shown in Fig. 1. The position "A" shown in dashed lines represents a forward position of the hand grip, whereas the position shown in solid lines represents a position thereof wherein the driver has pulled the hand grip 10 partially toward him. In addition, the position "B" of the hand grip 10 shows the manner in which the latter may be pushed down to a lower elevation at the option of the driver. As shown in Fig. 2, the position "X" of the hand grip 10 represents the position to which it would be rotated in order to turn the vehicle to the right, whereas the position "Y" shown in Fig. 2 illustrates a rotation through which the hand grip 10 would be pushed when making a left turn. Thus it should be apparent that my novel steering arrangement provides a very convenient steering means for a vehicle.

As stated in the objects of the invention, the tiller 6 and hand grip 10 can be pushed forward as shown at "A" in Fig. 1 and even beyond the position "A," so as to permit the tiller 6 to be pushed at least partially out of the driver's way in event that he is thrown forwardly by a sudden stop of the vehicle or by a collision. In addition, the tiller 6 can be pushed forwardly to get it out of the way to afford the driver of the vehicle a comparatively unobstructed access to the driver's seat when entering or leaving the vehicle.

I do not limit my invention to the exact form shown in the drawings, for obviously changes may be made therein with the scope of the following claims.

I claim:

1. A steering mechanism for a vehicle having a steering shaft within a rigidly mounted steering column, comprising an upper and a lower plate mutually rotatable, the lower plate being fixed to the steering column; a train of gears carrying rotational drive from gear teeth on the upper plate to a gear on the steering shaft, said train of gears being rotatably secured to said lower plate; and a tiller connected with said upper plate whereby the latter may be angularly displaced with respect to the lower plate to cause rotation of said steering shaft through said gear train, the tiller being adjustably connected with the upper plate to permit adjustment of the angle between the axis of the tiller and the plane of the upper plate.

2. In a mechanism as set forth in claim 1, connecting means carried on said upper plate and supporting the tiller comprising a yoke having a slot therethrough extending in a direction normal to the surface of the plate, and said slot being tapered to permit tilting of the tiller with respect to the plane of the plate, the tiller also being reciprocable in the slot along the axis of the tiller.

3. In a mechanism as set forth in claim 2, an abutment at one end of the tiller to prevent its withdrawal from the yoke and a hand grip at the other end of the tiller, and the engagement of the tiller with the yoke being sufficiently tight to frictionally resist changes in the position of the tiller with respect to the plate.

4. A steering mechanism for a vehicle having a steering shaft within a rigidly mounted steering column, comprising an upper and a lower plate mutually rotatable, the lower plate being fixed to the steering column; a train of gears carrying rotational drive from gear teeth on the upper plate to a gear on the steering shaft, said train of gears being rotatably secured to said lower plate; and a tiller connected with said upper plate and extending radially therefrom whereby the latter may be angularly displaced with respect to the lower plate to cause rotation of said steering shaft through said gear train, the connection of the tiller with the upper plate being non-rotatable with respect thereto, but permitting adjustment of the radial length of the tiller.

5. A steering mechanism for a vehicle having a steering shaft within a rigidly mounted steering column, comprising an upper and a lower plate rotatably secured together and mutually spaced, the lower plate being fixed to the steering column; a train of gears between the plates and carrying rotational drive from gear teeth on the upper plate to a gear on the steering shaft; and a tiller connected with said upper plate whereby the latter may be angularly displaced with respect to the lower plate to cause rotation of said steering shaft through said gear train, the tiller being adjustably connected with the upper plate to permit adjustment of the angle between the axis of the tiller and the plane of the upper plate.

6. In a mechanism as set forth in claim 5, connecting means carried on said upper plate and supporting the tiller comprising a yoke having a slot therethrough extending in a direction normal to the surface of the plate, and said slot being tapered to permit tilting of the tiller with respect to the plane of the plate, the tiller also being reciprocable in the slot along the axis of the tiller.

7. In a mechanism as set forth in claim 6, an abutment at one end of the tiller to prevent its withdrawal from the yoke and a hand grip at the other end of the tiller, and the engagement of the tiller with the yoke being sufficiently tight to frictionally resist changes in the position of the tiller with respect to the plate.

8. In a mechanism as set forth in claim 7, a housing over said connecting means and slotted to permit movement of the tiller therein.

9. A steering mechanism for a vehicle having a steering shaft within a rigidly mounted steering column, comprising an upper and a lower plate, the former being spaced from the latter and being rotatably mounted with respect thereto, and the latter being fixed to the steering column with the steering shaft extending into the interspace between said plates and carrying a gear at its upper end; toothed gear means fixed to the upper plate; a gear train within said interspace meshing with said gear on the shaft and with said means on the upper plate; and a tiller connected with said upper plate and extending radially outwardly therefrom whereby angular displacement of the tiller and associated upper plate causes rotation of the steering shaft through said gear train, the tiller being adjustably connected with the upper plate to permit adjustment of the angle between the axis of the tiller and the plane of the upper plate.

10. In a mechanism as set forth in claim 9, said upper plate having a downwardly extending annular flange to close said interspace and said toothed gear means comprising a sector of an internally toothed ring gear, said sector being secured to the inner surface of said flange.

11. A steering mechanism for a vehicle having a steering shaft within a rigidly mounted steering column, comprising an upper and a lower plate, the former being spaced from the latter and being rotatably mounted with respect thereto, and the latter being fixed to the steering column with the steering shaft extending into the interspace between said plates and carrying a gear at its upper end; toothed gear means fixed to the upper plate; a gear train carried by the lower plate and meshing with said gear on the shaft and with said means on the upper plate; and a tiller connected with said upper plate and extending radially outwardly therefrom whereby angular displacement of the tiller and associated upper plate causes rotation of the steering shaft through said gear train, said upper plate having a downwardly extending annular flange to close said interspace and said toothed gear means comprising a sector of an internally toothed ring gear, said sector being secured to the inner surface of said flange.

12. A steering mechanism for a vehicle having a steering shaft extending into its driver's compartment and rotatably supported on a rigid frame member of the vehicle, comprising a gear train supported on a rigidly mounted plate and connected to a gear driving said shaft; a housing rotatably mounted with respect to said plate and geared to drive said gear train; a tiller carried by said housing and extending therethrough; and tiller retaining means within the housing for frictionally gripping said tiller and resisting changes of elevation of the tiller in a plane containing the axis of said shaft and also resisting changes in the position of the tiller by reciprocation of the tiller along its own axis.

13. In a mechanism as set forth in claim 12, said retaining means comprising a yoke having a slot therethrough extending in an axial direction with respect to said steering shaft, said tiller snugly extending through said slot and being tiltable therein.

14. In a mechanism as set forth in claim 13, an abutment at one end of the tiller to prevent its withdrawal from the retaining means and a hand grip at the other end of the tiller.

15. A steering mechanism for a vehicle having a steering shaft extending into its driver's compartment and rotatably supported on a rigid frame member of the vehicle, comprising a gear train supported on a rigidly mounted plate and connected to a gear driving said shaft; a housing rotatably mounted with respect to said plate and geared to drive said gear train; a tiller carried by said housing and extending therethrough, said housing being slotted to permit tilting of the tiller therein; and tiller retaining means within the housing for frictionally gripping said tiller and resisting changes and also resisting changes in the position of the tiller by reciprocation of the tiller along its own axis.

16. In a mechanism as set forth in claim 15, an abutment at one end of the tiller to prevent its withdrawal from the retaining means and a hand grip at the other end of the tiller.

17. In a steering assembly for a vehicle having a driver's seat and having a steering shaft in front of the seat with a rotatable plate connected to rotate said shaft, a steering mechanism comprising two spaced mounting yokes fixed to said plate and slotted in a direction normal to the surface of the latter the rear yoke nearest the driver's seat having an elongated slot and the front yoke away from the seat having a shorter slot; and a tiller passing through both slots and reciprocable therein, the end of the tiller toward the seat being adjustable in elevation in the rear slot; and the engagement of the tiller with said slots being sufficiently tight to frictionally resist changes in the position of the former with respect to the latter.

18. In a mechanism as set forth in claim 17, an abutment at one end of the tiller to prevent its withdrawal from the front yoke, and a hand grip at the other end of the tiller.

References Cited in the file of this patent

UNITED STATES PATENTS

| | | |
|---|---|---|
| 716,709 | Hershey | Dec. 23, 1909 |
| 1,297,095 | Carr | Mar. 11, 1919 |
| 1,626,331 | Cresmer | Apr. 26, 1927 |
| 1,777,189 | Williams | Sept. 30, 1930 |
| 2,302,776 | Kemper | Nov. 24, 1942 |
| 2,638,014 | Railton | May 12, 1953 |